INVENTOR.
WAYNE F. CARR

United States Patent Office 3,558,484
Patented Jan. 26, 1971

3,558,484
SEPARATING APPARATUS
Wayne F. Carr, Rte. 2, Branson Road,
Oregon, Wis. 53575
Filed Dec. 11, 1969, Ser. No. 884,188
Int. Cl. B04c 5/10
U.S. Cl. 210—512                  1 Claim

ABSTRACT OF THE DISCLOSURE

A means and method for controlling the separation of good fibers from fiber bundles and mineral dirt, within a centrifugal separator, by disposing within the accept flow path a screen for separating elements or impurities of a higher specific gravity and/or greater shape than that of the accepted mixture.

BACKGROUND OF THE INVENTION

(1) Field of the invention

The field relates to centrifugal separators, and more particularly to hydrocyclones which separate a liquid suspension of solids or slurry into accepted and rejected fractions. Although not so limited, the invention has particular reference to conical separators. These are sometimes known as cleaners, used in paper making processes to separate clean, usable fibrous material from a flowing slurry which, in addition to the usable material, contains unwanted contaminants including specks, shives, floatables, system dirt, and tramp materials.

Centrifugal separators, or cyclones, are known for separating heavier components, such as solids, entrained in liquids and gases. When used to separate heavier components from liquids, they are frequently termed hydrocyclones or hydroclones.

Many conventional centrifugal separators of the free vortex type are known and such are usually classifiable into two general types. The first general type is termed the true free vortex separator wherein the liquid mixture is directed into the separator at a high input pressure in a tangential path such that the liquid mixture assumes a rotary path of travel in the separator which forms the vortex with the swirling liquid mixture being then moved downwardly into a cyclone chamber and then upwardly where the lighter liquid and particles suspended therein are drawn off through a suitable siphon tube. The other general type is termed a modified free vortex separator, since the same does not utilize a high input pressure, where the liquid mixture enters the separator at a low input pressure with a mechanically-operated impeller being provided for imparting the necessary rotary motion to the liquid to create the vortex. Once the vortex is created by the impeller, the separator then functions as a true free vortex with the swirling liquid mixture moving downwardly into the chamber and then upwardly where the lighter liquid and particles suspended therein are drawn off through the siphon tube.

(2) Description of the prior art

A hydrocyclone separator comprises a hollow body including a short cylindrical section connected to a circular conical section truncated near its apex. An inlet at the base or cylindrical end of the separator introduces slurry tangentially of its inner wall and in a manner to cause the slurry to progress from one end of the separator to the other in a swirling motion. The apex end of the separator is open, as is the base end which mounts a vortex finder or nozzle. The latter is located to receive and guide an inner vortex in which is comprised the accepted fraction of the slurry solids. The rejected fraction of the slurry discharges through the apex end of the separator.

In conventional free vortex separators, the swirling liquid mixture adjacent the center of the vortex travels at a greater angular velocity than the liquid mixture adjacent the outer portion of the vortex. Since only the lighter liquid and particles suspended therein of the upwardly swirling liquid mixture are drawn off through the siphon tube, the remaining heavier portions of the upwardly swirling liquid mixture recirculate in the vortex until either separated out or drawn off through the siphon tube.

In conventional modified free vortex separators, the power required to operate the impeller constitutes a major factor in the cost of operation thereof so that it is desirable to maintain the power requirements as low as possible. As there is no appreciable rise or drop between inlet pressure and outlet pressure in most modified free vortex separators, all of the energy added to the incoming liquid mixture by the impeller is consumed by losses, such as friction, liquid shear, turbulence or heat, since no means is provided for recovering any of this energy from the liquid mixture within the vortex and before the same is drawn off by the siphon tube. Therefore, the power requirements of conventional modified free vortex separators are high and, consequently, these separators are expensive to operate. Too, the power required to operate such separators varies considerably with any variance in the rate of flow of the liquid mixture through the separators, a highly undesirable fact for apparent reasons.

Hydrocyclones of the prior art used in cleaning cellulose suspensions and similar liquid-solid slurries have been relatively ineffective in removing foreign particles from mixtures above 1.0% fiber consistency (i.e. one part fiber per 100 parts liquid by weight).

Small separators (i.e. below fifteen inches in diameter) offer special difficulties when it comes to removing large particles having high length-to-width ratios, such as, shives, knots, and like objectionable contaminates, for the reason that, as a result of shear force, such particles are pulled into the higher angular velocity zones of the vortex and eventually pass into the normal accept zone and out through the accept outlet.

But separators of larger diameter present other problems in removing foreign contaminates. Therewith, if a high angular velocity is maintained to attain a resultant high centrifugal force, such particles are forced to the cone wall, and the shear force, normally tending to pull these particles through the high centrifugal force field, is overcome by the mass of the particles themselves and the centrifugal force acting thereon, with the result that these particles are frequently held in a stationary orbiting field, with a low probability of going either to the vortex finder area, as part of the accept fraction, or to the cone apex area, as part of the reject fraction.

Various solutions for overcoming the inherent various problems have been proposed.

Lower angular velocities have been considered to prevent the particles from being held at the cone wall. However, lower angular velocities, and the resulting lower centrifugal forces, decrease effective removal of the particles as rejects at the cone apex.

Increased cone diameters have been considered. However, an increase in diameter means a lower angular velocity and a lower centrifugal force. While it may help to minimize the difficulties inherent in stationary orbiting, nonetheless, due to an ineffective elimination of the finer foreign particles because of the lower centrifugal force, a narrowed particle size separation range results. And even with lower centrifugal force, particles having lengths in excess of two inches tend to remain in a sta-

SUMMARY OF THE INVENTION

The hydroclone hereof envisions the tangential introduction of a carrier fluid containing suspended solid matter under high input pressure into a cylindrical head and thence into an inverted cone or cyclone chamber, the liquid mixture swirling circumferentially and downwardly within the cone so that a vortex of conical shape is formed as the cone diameter decreases and the angular velocity and centrifugal force increase.

Due to the characteristics of centrifugal separators, particles of similar specific gravity or shape as the acceptable fibers are often retained within the desirable fiber flow.

This invention insures the cleaning of cellulose solutions, along with solutions of similar nature, so that objectionable fiber bundles are excluded from the desirable fibers. That is, the apparatus provides for the continuous separation from a fluid of impurities of higher specific gravities and does it without setting up any obstructions to the flow of fluid therethrough.

The objective is accomplished by the disposition of a screen structure relative to a vortex finder and driven rotatably by the force of the fiber flow with stationary blades or foils on the upstream side of the rotating screen structure for affecting discharge of particles from the screen surface and with an outlet circumscribing the screen for the removal of objectionable particles without further mixing thereof with incoming fiber flow.

An additional object of the invention is to provide a centrifugal cleaner possessing the advantageous structural features, the inherent meritorious characteristics and the means and mode of operation herein mentioned.

DESCRIPTION OF THE PREFERRED EMBODIMENT

Figure 1:
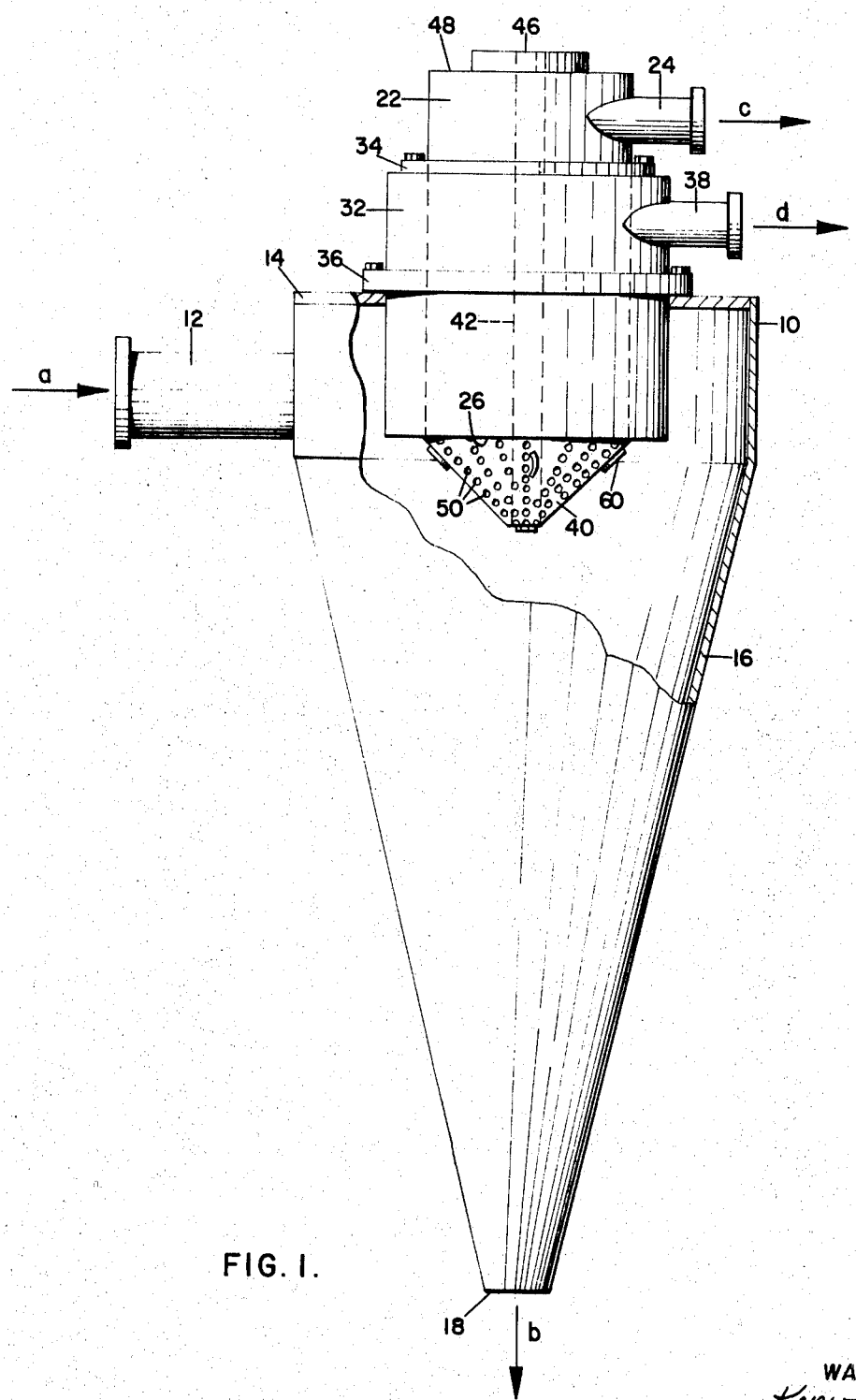
FIG. 1 is a broken view, in side elevation, of the device of the invention.
Figure 2:
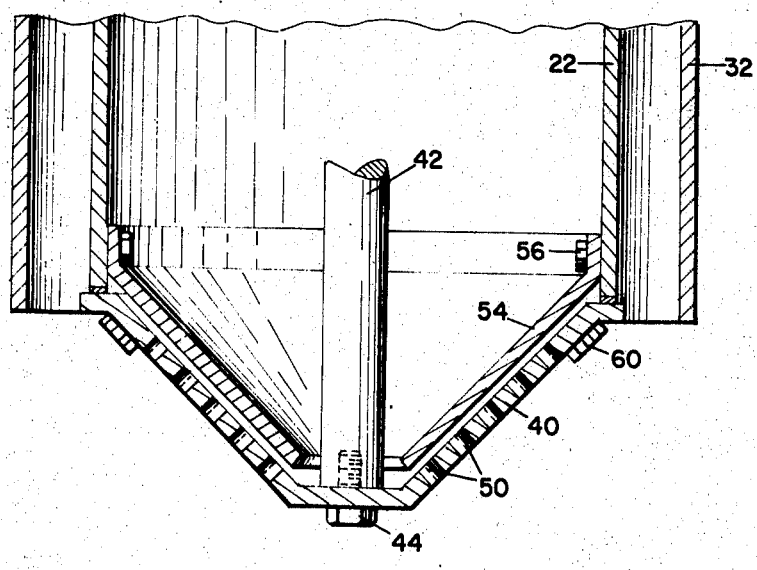
FIG. 2 is an enlarged fragmentary view, in side elevation, of the screen section within the cyclone shown in FIG. 1.

In the drawings, there is shown a hydrocyclone or centrifugal separator which includes a vertically-disposed elongate body or housing 10 of hollow cylindrical configuration which is tangentially intersected by a stock inlet 12 which may be of either circular or rectangular or square cross section and which supplies the water suspension and solid impurities to the hydrocyclone in the direction of arrow *a* from a line (not shown) used for transporting the mixture from one operation to another in a processing program. The inlet is connected to the body in off-set relation to the body center line so that the incoming liquid mixture arriving under pressure will follow a rotary path of travel as the same progresses downwardly in a swirling motion out of the body and into a vortex chamber.

Body 10 is suspended vertically by any suitable means and its top is enclosed as by an apertured cap or cover 14.

Depending from and communicating with body 10 is an enlongate truncated cone or vortex chamber 16 extending downwardly at a continuously-reduced internal diameter to a point of truncation or apex opening 18, the point of minimum internal diameter of the cone, serving as the primary rejected stock outlet, which outlet may be provided with valving movable between opened and closed positions to permit maintainance of pressure at the discharge point and to permit periodic dumping from the cone in the direction of arrow *b* of the waste particles removed from the liquid mixture.

Body 10 defines the base of cone 16, the interior configuration of the cone converging axially in one direction toward apex opening 18 and diverging axially in the opposite direction toward body 10.

The stock suspension to be cleared and, containing desirable or accept fibers and non-desirable or reject particles, is charged under pressure through inlet 12 and tangentially into cylindrical body 10. Input flow may be controlled, if desired, by a valve (not shown) in inlet 12.

Extending outwardly and axially and centrally of body 10 through the opening in cap 14 is a vortex finder or accept line or nozzle 22, having a lower extremity 26 extending interiorly of body 10, for removing the accepted fraction from the separator via outlet conduit 24 connecting to the vortex finder and outwardly thereof in the direction of arrow *c* for delivery to the next subsequent processing operation. Outlet conduit 24 is connected in off-set relation to the center line of vortex finder 22 so that the liquid mixture being discharged from the separator follows a rotary path of travel upwardly through the vortex finder and thence into the outlet conduit generally tangentially of the rotary path of travel.

The arrangement is one to introduce a suspension to be cleared into the cylindrical portion of body 10 tangentially to its inner wall, the continued pressure flow through the inlet causing the liquid suspension to progress in a swirling motion from the base end of the cone to its apex end, inducing, thereby, centrifugal forces in what is termed a free vortex path.

Thus, the downwardly-moving rotating or spiraling mixture moves into the inverted cone where it is forced inwardly toward the axis of the vortex section and thereby causing the angular velocity of the liquid mixture to increase.

During this downward movement of the rotating liquid mixture, the heavier particles therein are forced outwardly toward the wall of the vortex section by centrifugal force while the lighter particles move inwardly toward the axis of the vortex. Therefore, the heavier particles move downwardly in the outer portion of the vortex and the lighter particles move downwardly in the inner portion thereof.

The spiraling motion develops the desired centrifugal and shear forces within the cone section.

As the flow proceeds downwardly toward the apex opening, the action develops within the free vortex zone, and then within a forced vortex zone wherein the fluid with accepted particles moves upwardly in a rotary path of travel circumscribing a central air column.

The free vortex zone has an angular velocity which increases in radial direction from the outer cone wall toward the center of the unit. The forced vortex zone on the other hand has an angular velocity which decreases in radial direction from the outer cone wall toward the center of the unit.

During downward flow in the free vortex path, the heavier particles are forced outwardly toward the cone wall by the centrifugal force, while the lighter particles are urged inwardly toward the vortex axis. The heavier particles are entrained and move downwardly in the outer portion of the path; the lighter particles are entrained and move downwardly in the inner portion thereof. Dirt and like reject particles which can more easily pass through the high centrifugal force field continue downwardly to and through apex opening 18 in the direction of arrow *b*.

As a result of these forces, there is left, in the axis of the device, a liquid-free core area of low pressure and an inner vortex of fluid moving contra to an outer vortex, that is in a direction from the apex end of the separator to its base end. Finder or nozzle means located in the overflow end of the separator device has one end extending inwardly of the shell to receive the inner vortex and to conduct it out of the shell. The outer end of such finder means is adapted for connection to a suitable conduit to conduct the materials caught in the inner vortex for use in a subsequent process step. In accordance with the concept and mode of operation of hydrocyclonic separators of the instant kind, air and relatively light and clean fibers from the slurry are gathered by the inner vortex and conducted out of the base end of the device as the accepted fraction while the remainder of the liquid suspension leaves the device through the apex end thereof.

An outer optional reject conduit 32 is provided to circumscribe and be concentrically related to vortex finder 22, is held in spaced relationship therewith as by a cap 34, and extends into body 10 and is held with respect thereto by a centering ring 36 bolted to cap 14.

An optional reject outlet 38 leads from the optional reject conduit 32 for removing the rejected fraction in the direction of arrow d.

A rotatable coneshaped perforated screen 40 is provided at the lower end 26 of the vortex finder so as to enclose the vortex finder and to be disposed within cone 16 and performs a significant flow control function, as will appear.

Screen 40 is mounted relative to the vortex finder as by a centrally-related vertically-disposed shaft 42 to which it is secured by means of bolting 44.

The shaft is journalled in a bearing housing 46 mounted on a top wall 48 of the vortex finder wherefor the shaft is extendible downwardly from the bearing housing in manner to facilitate the rotation of the screen when same is driven by forces generated by the body. Alternatively, and if desired the shaft may be powered by an external motive force, such as a drive motor.

The heavy particles of sand, metal and large bundles of shives are separated from the flow at apex 18. However, particles having a specific gravity similar to or less than that of the cleaned or accepted flow tend to remain in the accept flow path and to flow upwardly toward the vortex finder where portions thereof are intercepted by screen 40.

Screen 40 is perforated with openings 50 therethrough so as to admit therethrough and into the vortex finder acceptable clean fibers and liquid of the accept flow and to deny entrance therethrough of any objectable particles entrained in the accept flow.

As aforesaid, the acceptable flow passes through the vortex finder and outwardly thereof through outlet 24.

Objectionable particles are recirculated ito the incoming flow, finally to be rejected through reject opening 18, or removed by passage into outer optional reject conduit 32 circumscribing the vortex finder and out through outlet 38.

To insure against any plugging of openings 50, a plurality of stationary blades or foils 54 are mounted with respect to the inner wall of the vortex finder as by bolting 56 and are projected downwardly and inwardly so as to extend generaly radially of and to lie adjacent the inboard surface of screen 40.

Each blade or foil 54 has its free inner end spaced from shaft 42 and from such free inner end curves outwardly toward the wall of the vortex finder.

From two to six blades or foils may be employed, equispaced with respect to each other, and depending upon the rotative speeds attained with the screen.

Optimum results are obtained when the stationary blades or foils are disposed within 0.0025" distance from the inboard surface of the screen.

Outboard of the screen and secured to the outer face thereof, impeller vanes 60 are provided.

The impeller vanes function to move the screen so as to attain a speed sufficient for effecting a cleaning of the screen perforations.

The screen is rotated by virtue of the flow through the unit.

The center zone of the flow section pattern of the cyclone is of particular interest in that the speed characteristics of the flow follows that of a hub or wheel. By placing a screen with impeller type vanes within this zone, the flow of the material will turn the screen at approximately the same speed as the swirling flow.

The rotating speed of the flow passing through the unit is normally sufficient to eliminate need for any external drive to maintain the screen rotation. When, however, a low external pressure is available to maintain a 10 p.s.i. drop through he unit, a drive to insure screen rotation becomes essential in retaining sufficient pulse at the screen plate to remove material from the holes.

The screen plate angle is important to increase the area for screening. The finer the separation of particles required, the smaller the holes or opening and thus the more screen area required. By decreasing the included angle of the screen plate, this becomes possible. For coarse particles, larger holes and less screen area or greater included angles at the screen are desirable.

As the screen rotates, a pressure force is generated which tends to dislodge materials caught in openings 50 away from said openings and toward one of the plurality of impeller vanes 60 and away from the screen.

Thus it will be appreciated that the downwardly-moving rotating liquid mixture in the free vortex zone is then turned back upon itself, absent the reject fraction of the heaviest particles of solid matter drawn off through apex opening 18, to move upwardly while continuing its rotation.

As the liquid mixture moves upwardly in the forced vortex zone, the material is screened and heavier particles thereof move outwarly into the downwarly moving liquid mixture and lighter particles from the downwardly moving liquid mixture move inwardly into the upwardly moving liquid mixture and are carried upwardly therewith.

The mixture is screened before passage into the vortex finder by means of screen 40 so that the acceptable portion of the upwardly moving liquid mixture passes through the screen and into and through the vortex finder and out outlet conduit 24 and through the line in which the separator is connected.

The portion of the upwardly-moving, rotating liquid which is not passed through the screen and into the vortex finder continues its movement upwardly along the screen and into contact with the lower surfaces of the impeller vanes.

Since this upwardly moving liquid mixture has a higher angular velocity than the liquid mixture in the outer portion of the vortex, the upwardly moving rotating liquid mixture tends to drive the impeller vanes and thus imparts energy to the screen.

I claim:

1. A centrifugal separator for separating the unacceptable impurities from a suspension containing acceptable fibers comprising:
    (a) a vessel having an elongated vertical axis and being of substantially circular cross section and having an upper inlet chamber for receiving the suspension charged tangentially thereinto and a lower frustoconical vortex chamber in fluid communication with the inlet chamber for receiving the suspension therefrom and vortexing the suspension in a downward spiral flow along a free vortex path outwardly of a transition zone extending generally parallel to the vertical axis of the vessel toward the lower end of the conical vortex chamber,
    (b) a first discharge means in fluid communication with the lower end of the vortex chamber for collecting the migrated first reject fraction of the suspension and discharging same from the vessel,
    (c) a vortex finder defining an accept conduit means disposed concentrically of the inlet chamber and having a lower inlet end within and coaxial with the vessel and an upper discharge end extending outwardly of the vessel for reversing the downward flowing accept fraction of the suspension from the free vortex path into an upwardly flowing force vortex path inwardly of the transition zone,
    (d) a second discharge means concentrically circumscribing and having a lower inlet end in the plane of the lower inlet end of the vortex finder and having an upper discharge end extending outwardly of the vessel, and (e) an externally-vaned cone-shaped screening means disposed in the inlet end of the vortex finder for screening the acceptable portion of the accept fraction of the suspension for acception thereinto and collecting and discharging same from the vessel and being rotated by the energy imparted to the vanes thereof by the upwardly-swirling vortexed mixture, (f) the second discharge means defining a means for collecting the migrated nonacceptable portion of the accept fraction of the suspension as rejected by the screening action of the screening means and discharging same from the vessel.

References Cited
UNITED STATES PATENTS 3,439,810   4/1969   Newman et al. _____ 210—512

J. L. DeCESARE, Primary Examiner

U.S. Cl. X.R.

209—211